Figure 1:
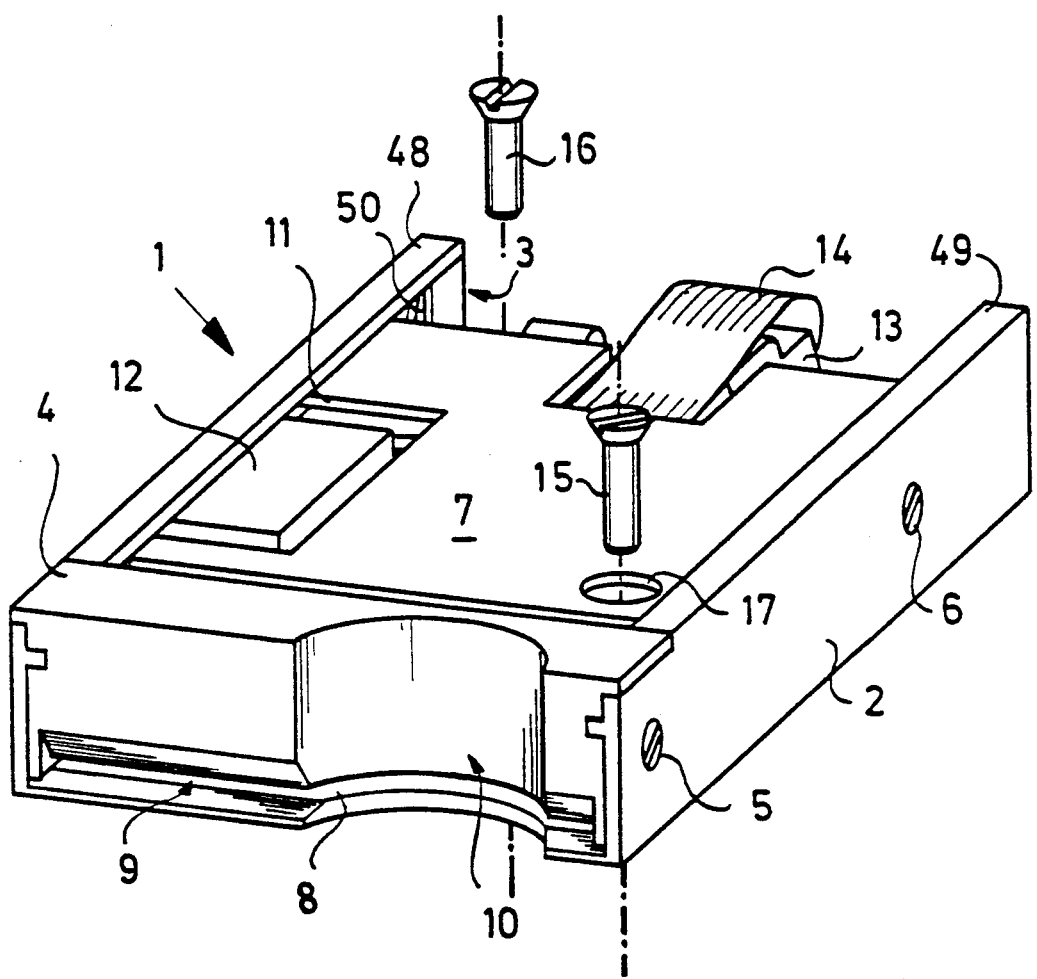

United States Patent [19]
Hug et al.

[11] Patent Number: 5,120,946
[45] Date of Patent: Jun. 9, 1992

[54] DEVICE FOR RECEIVING DATACARDS

[75] Inventors: Klaus Hug, Oberndorf; Otmar Modest, Niedereschach; Jürgen Götz, Villingen-Schwenningen, all of Fed. Rep. of Germany

[73] Assignee: Mannesmann Kienzle GmbH, Villingen-Schwenningen, Fed. Rep. of Germany

[21] Appl. No.: 489,453

[22] Filed: Mar. 6, 1990

[30] Foreign Application Priority Data

Mar. 9, 1989 [DE] Fed. Rep. of Germany ....... 8902863

[51] Int. Cl.⁵ .................. G06K 7/01; G06K 13/08
[52] U.S. Cl. .................. 235/441; 235/482; 235/486
[58] Field of Search .......... 235/441, 492, 487, 486, 235/475, 482

[56] References Cited

U.S. PATENT DOCUMENTS

| 4,724,310 | 2/1988 | Shimamura et al. | 235/441 |
| 4,810,863 | 3/1989 | Kachi et al. | 235/441 |
| 4,835,375 | 5/1989 | Shimamura et al. | 235/482 |

FOREIGN PATENT DOCUMENTS 63-236187 10/1988 Japan.

Primary Examiner—Robert Weinhardt
Attorney, Agent, or Firm—Toren, McGeady & Associates

[57] ABSTRACT

A device for receiving data cards, including an essentially square-shaped housing; a guide chute for the data cards, the housing having a loading/output slot which forms an access to the guide chute; arrangement for read-in and readout of data from the data cards; mechanism for locking and unlocking the data cards, including a movable stop provided so as to cooperate with an end side of a loaded data card pointing inwards into the device; a gear connection for connecting the at least one latch with the movable stop; and a safety catch engageable with the geared connection, the at least one latch being arranged so as to embrace an outwardly pointing end side of the data card when the data card is in an end position in the device, the geared connection including a slide having one end connected to the movable stop for the inwardly pointing end side of the datacard, and a second end provided with a set of teeth the latch having a toothed quadrant and being rotatable supported and meshing with the set of teeth of the slide by way of the toothed quadrant.

7 Claims, 4 Drawing Sheets

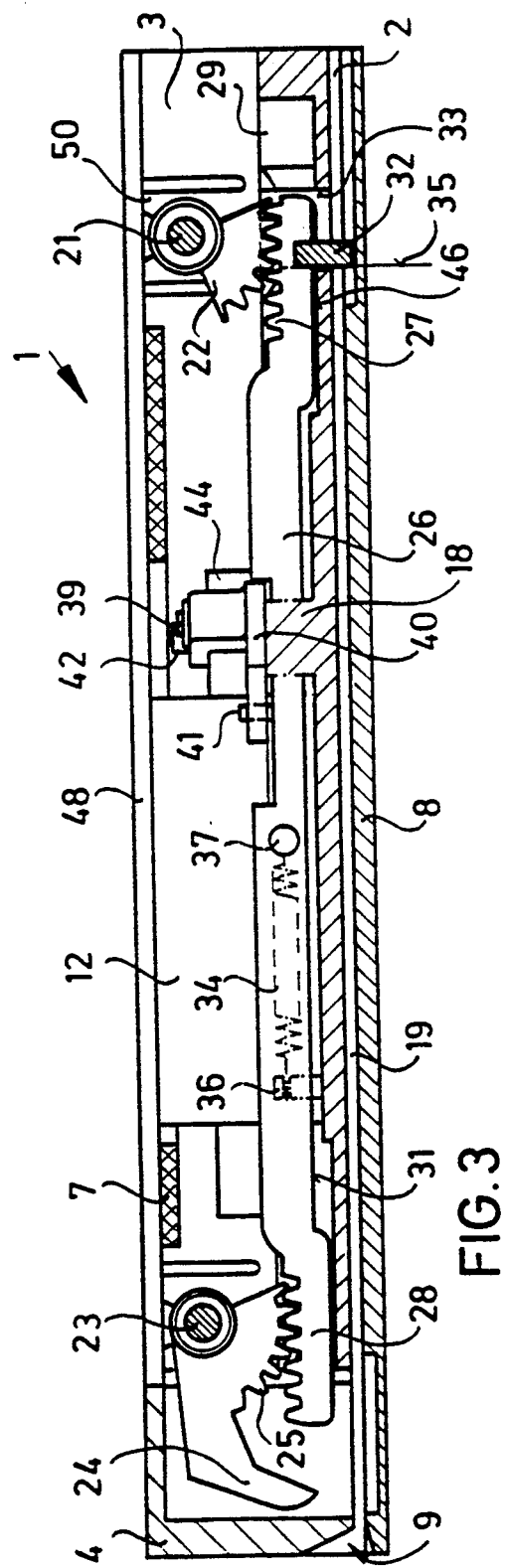
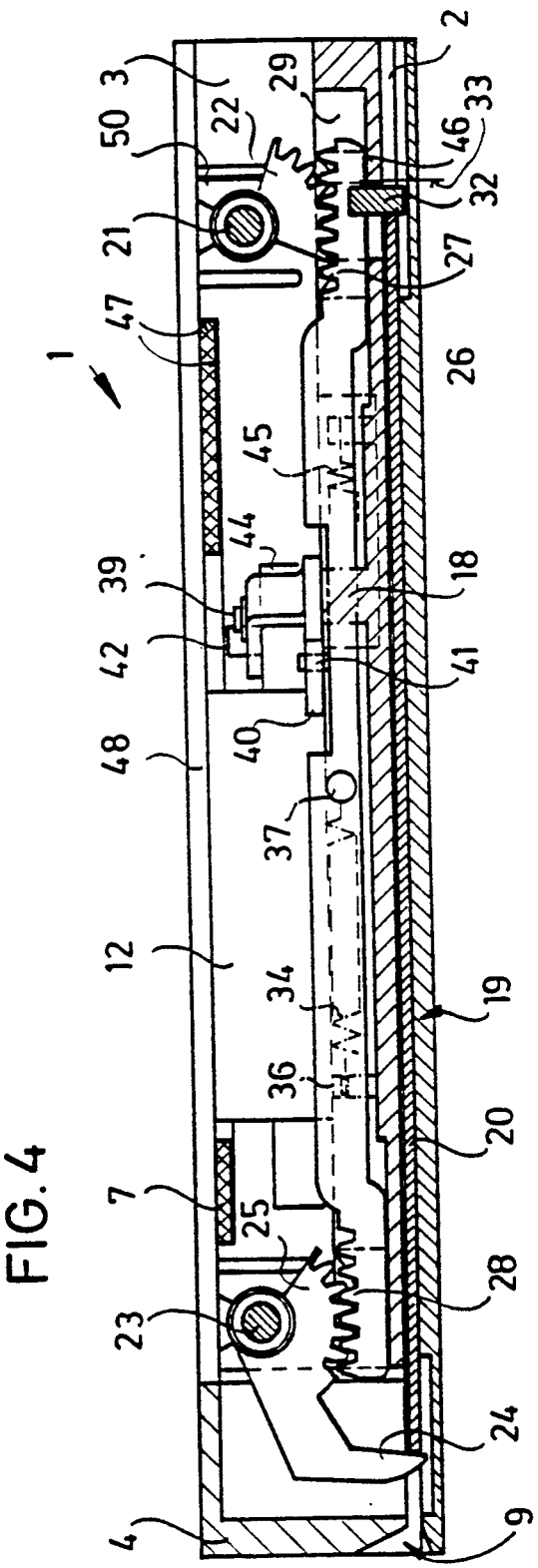
FIG.3
FIG.4

DEVICE FOR RECEIVING DATACARDS

The innovation is directed to a data card receptacle with an essentially square-shaped housing, with an input-/output slot and a guide chute for data cards assigned to same, with means for loading-/and readout of the data from the data cards and with means for locking- and unlocking of the data cards such that a movable stop is provided, with which the front side of a loaded data card pointing inwards referred to the data card receptacle cooperates, that at least one latch is provided which is in geared connection with the mobile stop, that a safety catch is assigned to the geared connection and that the front side of the data card pointing outwards in the end position of the data card in the data card receptacle is embraced by the latch.

Data cards assume increasing significance as mobile data carriers indeed for a plurality of applications because of a relatively high storage capacity as well as a satisfactory data security.

With the increasing importance of the data cards as information carriers and the increasing functions and value contents of the data cards however the requirements expected of the means serving as the receptacle for the data cards in their read-write positions within an apparatus also rise.

Thus a precise positional fixation of the data cards by means of suitable guides and an appropriately precise design and arrangement of the set of contacts to be scanned is especially required for chip-data cards, because of the plurality of the tightly grouped contacts to be scanned. It is known to use special transport or conveyance trolleys for data cards in order to fulfill these requirements. Several application cases necessitate additional latching arrangements and access assurance means, meaning the data card receptacles concerned, which are perceived by the user as a rule only as slots at an apparatus front face into which the data cards have to be loaded, develop into relatively expensive receiving aggregates.

An example herefor is the area of data acquisition in motor vehicles. Because of the documentary value of the recordings and the required manipulation security, the requirement of the data card receptacles intended for vehicle apparatus are high and such is also the space requirement. On the other hand the apparatus intended for trip data—and working time recording or fare determination must be able to be housed in the limited space available on the dashboard of a motor vehicle by being sufficiently compact, because of their having to be within reach of the driver, as well as having to fulfill the conditions in a production line applying to the motor vehicle sector.

The data card receptacles known in credit card operation, as bank tellers, parking meters and automatically metered gas fill-up stations cannot at all or only partially live up to these requirements; in particular the means for latching and unlatching the data cards are extraordinarily expensive as far as fabrication and assembly in the known data card receptacles is concerned. Furthermore, they are prone to malfunction because of the multiplicity of their parts and the high quantity of support or bearing points, their maintenance is expensive and they require relatively much space within the housing contours of the data card receptacle, so that depending upon the application case either not all electronics components of the data card receptacle required for communicating with the data card can be assigned to the data card receptacle, or a relatively high constructional height must be tolerated. Accordingly, such data card receptacles cannot be universally used, quite apart from the expense involved.

Thus the task arose to create locking and unlocking arrangements for a data card receptacle, which provide a maximum of free space within given housing dimensions, are easily producible in series manufacture as well as being distinguished by a high functional reliability.

Proceeding from the previously described state of art the solution of this task is characterized in that a slide is provided, at which on the one hand the stop for the inwardly pointing end face of the data card, on the other hand a set of teeth is configured and that the latch is rotatably supported and meshes with the set of teeth of the slide by means of a toothed quadrant assigned to it.

An expedient refinement can be seen in providing a second shaft supported between the side walls of the housing of the data card receptacle, which carries a coupling arrangement assigned to the points of intersection with the data card and is also in geared connection with the slide by means of a toothed quadrant, wherein the slide has an essentially rectangular profile and is guided in a groove, which is configured on the opposite side of a wall of the data card receptacle forming the guide chute and that the stop located on the slide engages into the guide chute through a penetration in the wall.

Further advantageous embodiments of the innovation result from dependent claims which have not yet been cited.

The innovation affords the advantage that the manufacture—and installation costs are reduced to a minimum by the smallest possible quantity of components and by especially simple and ruggedly designed components easy to install. This means that not only a good reproducibility and satisfactory guidance accuracy of the components exist in spite of large manufacturing tolerances, rather the conditions for a mechanized assembly are also created. Through this the requirements concerning maintenance-free operation and functional reliability are simultaneously fulfilled also in case of careless handling of the data card receptacle under the rough operational conditions prevailing in the motor vehicle, this not lastly because of the avoidance of support or bearing points. The solution thus found provides the desired free space within the housing of the data card receptacle and thus room for all the electronic components required for exchangeability and universal applicability of the data card receptacle.

Figure 2:
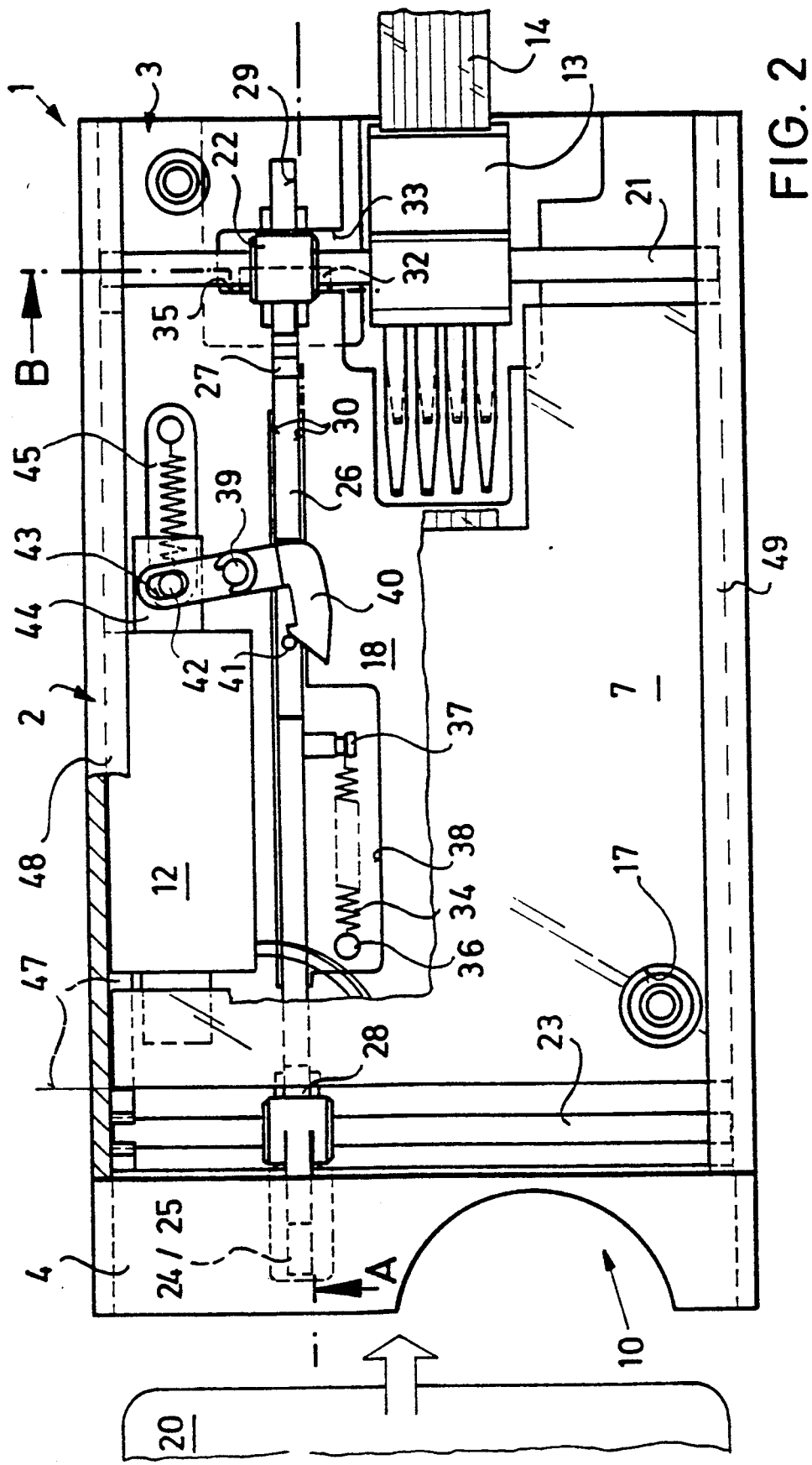
Figure 5:
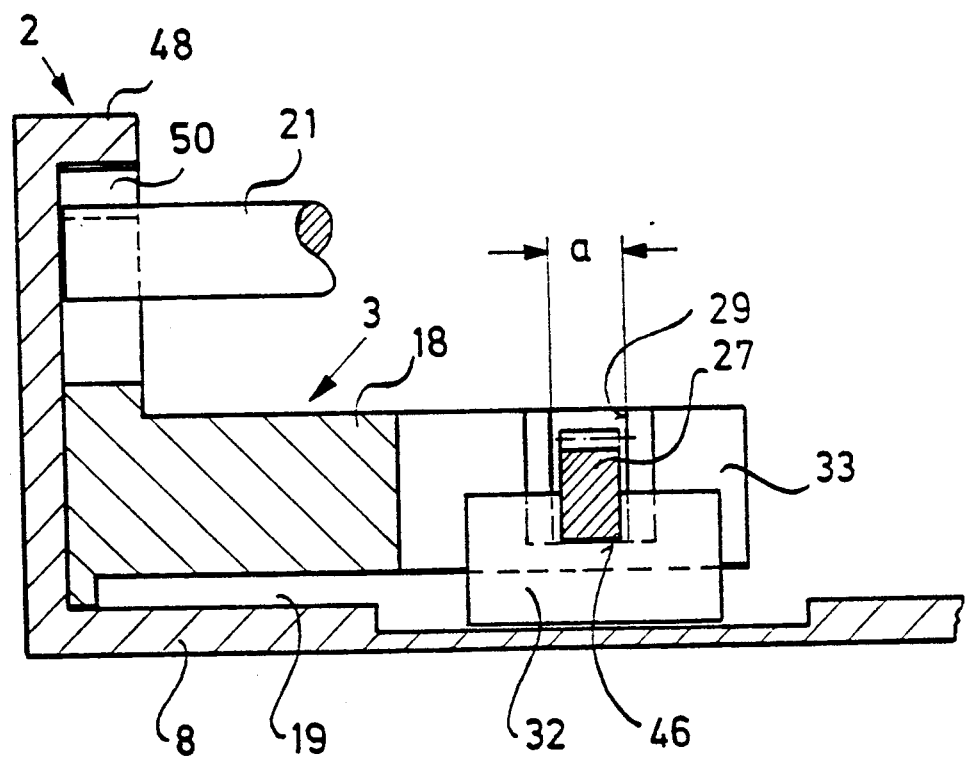

The innovation will be described in the following with particularity with the help of the attached drawing. It is shown on:

FIG. 1 a drawing in perspective of the novel data card receptacle,

FIG. 2 a plan view of the data card receptacle with the circuit board cut open,

FIG. 3 a sectional presentation of the data card receptacle along the section line A in FIG. 2 without a data card, FIG. 4 a sectional presentation of the data card receptacle along the section line A in FIG. 2 with the data card locked in the guide chute; and FIG. 5 a partial section of the data card receptacle along the section line B in FIG. 2.

The housing 1 of the data card receptacle comprises three components according to FIG. 1, a U-shaped carrier or supporting beam 2, a slide-in module 3 and a frontal shield 4. The three housing components 2, 3 and 4 are manufactured by injection molding and are additionally secured in a suitable, here not indicated manner, for instance by means of groove-web connections or mutual embracing of wall portions and by means of screws 5 and 6, of which two can be seen in FIG. 1, wherein, with the self-locking design of the butt connection, one can also do without the threaded fasteners.

It is furthermore discernible from FIG. 1 that the square-shaped housing 1 is bounded on one side by a printed circuit board 7, which supports at least the electronic elements, by means of which the control—and inspecting measures required for the loading—and output and for the locking and unlocking of the data cards as well as the contacting can be performed. The rearward end face is open. The front shield 4 forms together with a wall 8 of the carrier or support beam 2 a suitably wedge-shaped loading—and output slot 9. Registering depressions are molded into the wall 8 and into the front shield 4, which together form a handle recess 10.

An electromagnet 12 serving for unlocking of a loaded data card can be discerned through a penetration 11 in the printed circuit board 7. 13 designates a set of contacts serving as a coupling device, which is pivotably supported and is connected to a printed circuit board by a flexible conductor strand 14, which will be described in more detail later. The external connection of the data card receptacle and its energy supply is also assured by a flat strand cable connectible with the printed circuit board 7, which however is not shown. Two screws 15 and 16 which cooperate with the wall 8 of the carrier beam 2 serve for the attachment of the data card receptacle in the device where it is used; the aperture 17 in the printed circuit board 7 is merely provided for passage of the screw 15.

The plan view in FIG. 2 and the transverse section in FIG. 3, which will be described together, show that a guide chute 19 downstream of the loading—and output slot 9 is configured between the wall 8 of the support beam 2 and the wall 18 of the slide-in module 3, which chute serves for receiving a data card 20. It is further discernible that the set of contacts 13 is fastened to a shaft 21, which carries a toothed quadrant 22 and is supported in snap bearings configured in the side wall of the slide-in module 3, one of the bearing arms being designated by the numeral 50. A shaft 23 supported in a similar manner carries a latch 24 which forms one single part with a toothed quadrant 25. The two toothed quadrants 22 and 25 are in geared connection by means of a slide 26 at which sets of teeth 27 and 18 assigned to the toothed quadrants 22, 25 are configured. The slide 26 has essentially a rectangular profile and is loosely supported in a guide groove 29. The guide groove 29 on its part is configured on the side of the wall 18 opposite to that of the guidance chute 19 and is provided with clearance 30 in such a way, that the slide 26 is guided only at its outer ends relatively tightly on the side (dimension a in FIG. 5). Equally the slide 26 is only seated with its outer end, where it meshes with the toothed quadrants 22 and 25 and is retained by same in the guide groove 29, in the base (travel\face 46) of the guide groove 29. The intermediate region of the slide 26 is recessed 31, so that the slide has no contact with the wall 18 in that area.

A stop 32 is molded at the slide 26, which protrudes through a penetration 33 in the wall 18 into the guidance chute 19 and which rests either at the front face of the loading data card 20 as shown in FIG. 4 or at a front face 35 of the wall 18 formed by the recess 33, this under the action of a tension spring 34 acting upon the slide 26. The tension spring 34 as well as its suspension, the posts 36 and 37, are arranged to be sunk within a recess 38 provided in the wall 18. The tension spring 34 is a part of a safety catch assigned to the slide, whose locking pawl 40 supported rotatably upon an axis 39 cooperates on the one hand with a lug 41 fastened to the slide 26 and on the other hand is coupled with the anchor 44 of the electromagnet 12 by means of a pin-slot connection 42, 43 and is exposed to the action of a tension spring 45.

It should be mentioned for completeness' sake, that the printed circuit board 7 is retained in the housing 1 of the data card receptacle in that recesses 47 are configured in the side walls of the sliding unit 3 and in that at least partially inwardly pointing webs 48, 49 are molded to the side walls of the carrier beam 2, which overlap or embrace the printed circuit board 7 and the side walls of the slide-in module 3. The electromagnet 12 inserted into a suitable free clearamce and deepening in the slide-in module 3 is fastened in the same manner, meaning the butt end connections are provided not only for the housing components 2, 3 and 4 rather also for the functional parts of the data card receptacle, so that one gets an optimum space utilization and a minimization of the component—and installation costs through avoidance of attachment and security elements.

The functioning of the novel arrangement is as follows:

When the data card 20 is inserted into the guidance pit or chute 19 to such an extent, that its inwardly pointing end side rests at the stop 32, than if the data card 20 is slid in further simultaneously the slide 26 is displaced counter to the action of tension spring 34 and by constraint the elements which are in geared connection with the slide 26 are also actuated, meaning the shafts 21 and 23 are swiveled and with that the set of contacts 13 is lowered and the latch 24 is pivoted in front of the outwardly pointing end side of the data card 20. The end face 35 of the free clearance 33 assigned to the stop 32 serves as security against overstroking. Prior to reaching this position the safety catch becomes effective, by the pawl 40 snapping onto the lug 41, which safety catch can be unlocked again by means of the electromagnet 12. Herein the flexurally supported slide 26 is additionally assigned an ejection function for the data card 20.

We claim:

1. A device for receiving data cards, comprising:
an essentially square-shaped housing;
a guide chute for the data cards, the housing having a loading/output slot which forms an access to the guide chute;
means for read-in and readout of data from the data cards;
means for locking and unlocking the data cards, including a movable stop provided so as to cooperate with an end side of a loaded data card pointing inwards into the device;
geared connection means for connecting at least one latch with the movable stop; and
a safety catch engageable with the geared connection means for locking the geared connection means, said at least one latch being arranged so as to embrace an outwardly pointing end side of the data card when the data card is in an end position in the device, the geared connection means including a slide (26) having one end connected to the movable stop (32) for the inwardly pointing end side of the datacard (20), and a second end provided with a set of teeth (28), the latch (24) having a toothed quadrant and being rotatably supported and meshing with the set of teeth (28) of the slide (26) by way of the toothed quadrant (25).

2. A device according to claim 1, wherein the latch (24) is formed as one piece with the toothed quadrant (25), and is fastened on a shaft supported transversely to the direction of motion of the data card (20) in side walls of the housing (1) of the data card receptacle.

3. A device according to claim 1, wherein the slide (26) is loosely guided on at least one guide groove configured in the housing (1).

4. A device according to claim 1, wherein the slide (26) has essentially a rectangular profile and is guided in a groove (29), which is configured on an opposite side of the wall (18) of the data card receptacle forming the guide chute (19), and the stop (32) located on the slide (26) engages into the guide chute (19) through a cut out (33) in the wall (18).

5. A device according to claim 2, and further comprising a second shaft (21) supported between the side walls of the housing (1) of the data card receptacle, which second shaft carries said means for read-in and readout of data (13) that cooperates with points of interface with the data card (20), the second shaft also being in geared connection with the slide (26) by way of a second toothed quadrant (22).

6. A device according to claim 1, wherein the safety catch (34, 39, 40, 41, 45) cooperates with the slide (26) and is electromagnetically (12, 42, 43, 44) unlockable.

7. A device according to claim 1, wherein the safety catch further is operationally connected with the slide (26) for locking the slide, the safety catch further being unlockable by a latch actuatable from outside of the data card receptacle.

* * * * *